Oct. 29, 1957     D. L. WICKS     2,811,152
UTENSIL
Filed Feb. 21, 1955

INVENTOR.
DONALD L. WICKS
BY
ATTORNEYS

2,811,152
UTENSIL

Donald L. Wicks, Minneapolis, Minn., assignor to Foley Manufacturing Company, Minneapolis, Minn., a corporation of Minnesota Application February 21, 1955, Serial No. 489,336

4 Claims. (Cl. 126—385)

This invention relates to new and useful improvements in kitchen utensils adapted primarily for the covering, protecting and containing, or baking of pies or the like.

Broadly speaking, the invention comprises a two-part covered pan having several unique features, such as the configuration, size and relation of the two parts, the retention of one part in juxtaposition to the other part by detent clips, the particular clips forming handles for part of the pan (usually designated as the bottom) and a resilient means biasing the two parts to separated position.

Objects of the invention are: to provide a new and useful two part covered pan in which one part or section may be used to make baked goods of larger diameter and a second section to make baked goods of smaller diameter; to provide novel means for retaining the parts in juxtaposition; to provide new and useful handles for manipulating the pan; to provide a new and useful configuration of a covered pan; and to provide a novel retaining and releasing means for a two section covered pan.

Other objects inhere in the structure described, pictured and claimed and will become more fully apparent as the description proceeds.

To the accomplishment of the foregoing and related ends, this invention then comprises the features hereinafter fully described and particularly pointed out in the claims, the following description setting forth in detail certain illustrative embodiments of the invention, these being demonstrative, however, of but a few of the various ways in which the principles of the invention may be employed.

The invention will be described with reference to the drawings, in the several figures of which corresponding numerals refer to the same parts and in which.

Figure 1:
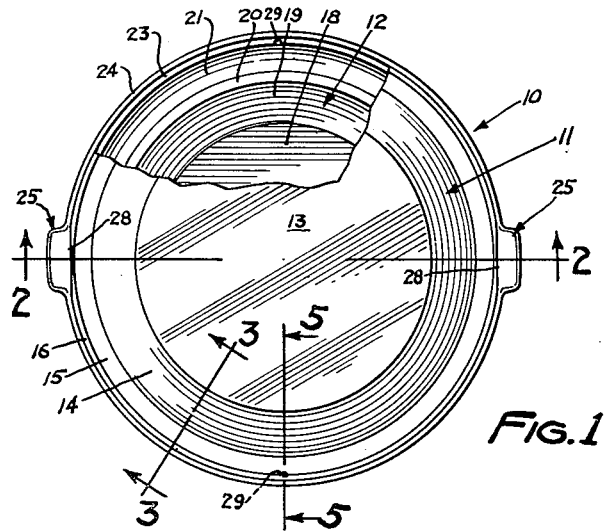
Figure 1 is a plan view, partially broken away, of the instant invention.

In the drawings, and particularly in Figure 1, there is shown a pan generally designated 10 comprised of two similar parts or halves 11 and 12 of a resilient material, usually metal, joined along a median line. For convenience in nomenclature and normally, part 11 is generally designated as the top or lid of the pan and part 12 is designated as the bottom. Nevertheless, as will be more fully appreciated as the description proceeds, the pan may be inverted from the position of Figure 2 in which instance the part 11 becomes the bottom and the part 12 becomes the top. Throughout this description, it will be assumed that the pan is in the position of Figure 2 and the words "top" and "bottom" will be referred thereto.

The top 11 comprises a hollow vessel provided with a circular plate member 13 and an outwardly declined wall 14 further declined to provide an annular rim 15 edged by a rolled bead 16.

The bottom 12 is likewise provided with a circular plate 18 joined to an inclined wall 19 and provided with a rim 20 similar to rim 15. However, it will be apparent from inspection of Figure 2 that rim 20 is substantially horizontal while rim 15 is slightly declined.

Adjacent rim 20 is provided an annular depression 21 joined to a substantially vertical wall 22 provided with an annular rim or shoulder 23. Shoulder 23 terminates in a rolled bead 24 around the periphery thereof except throughout the two portions occupied by detent handles 25.

Figure 2:
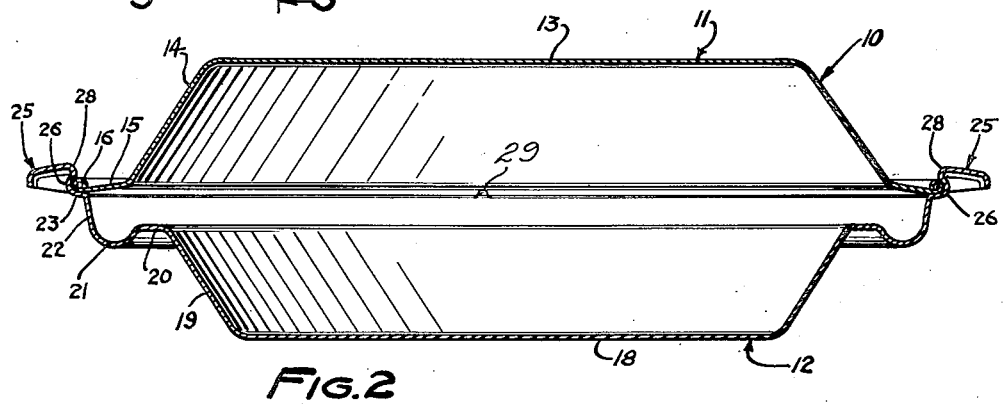
Figure 2 is a vertical sectional view taken along the line and in the direction of the arrows 2—2 of Figure 1.

Handles 25 are of the configuration best shown in Figures 1 and 2 and are provided with a depression 26 joined to a detent 28.

Figure 3:
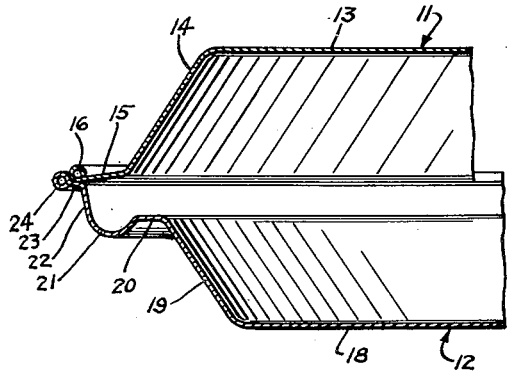
Figure 3 is a fragmentary vertical sectional view taken along the line and in the direction of the arrows 3—3 of Figure 1.

Thus, as will be seen, the rolled bead 16 of top 11 normally rests upon portion 23 and in communication with bead 24 as shown in Figure 3. Throughout the portions of the periphery of member 12 occupied by handles 25, there is of course no rolled bead 24 and bead 16 rests in concavities 26 and is retained therein by detent 28, thus retaining the two members in juxtaposition as shown in Figure 2.

Figure 5:
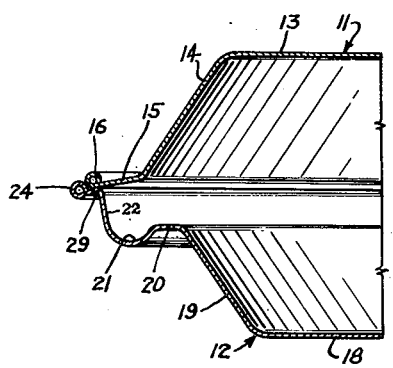
Figure 5 is a vertical sectional view taken along the line and in the direction of the arrows 5—5 of Figure 1.

Positioned at substantially right angles to a line drawn to the opposed handles 25 are two dimples 29 likewise in opposed relation. These dimples 29 are provided in bottom 12 and provide rounded projections extending upwardly in the direction of engaging bead 16 as shown in Figure 5. These dimples operate to slightly bend the top 11 along a line drawn therethrough and thus to slightly space the bead 16 from portion 23. In this manner, bead 16 with reference to Figure 2, engages depression 23 throughout the handle portions 25 and with reference to Figure 1, is slightly spaced from depression 23 at dimples 29, the spacing decreasing from dimples 29 in the direction of the handles 25.

Figure 4:
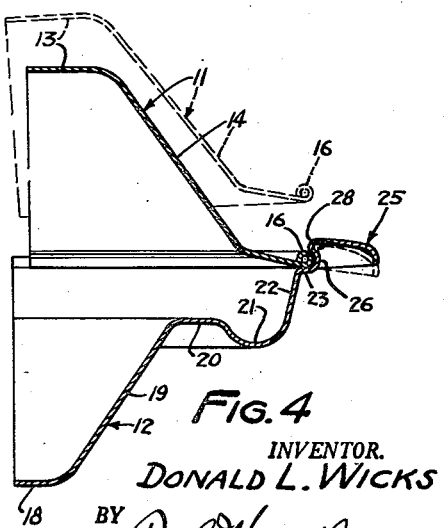
Figure 4 is an enlarged fragmentary vertical sectional view similar to the view of Figure 2 but showing operation of one of the detent handles of the present invention.

When it is desired to remove the top 11 from the bottom 12 either one or both of the handles 25 is pressed from the full to the dotted line position of Figure 4, moving the detent 28 outwardly with reference to bead 16, and the dimples 29 having placed the resilient cover 13 under stress will cause it to "pop" slightly so that a finger may be engaged under bead 16 and the top may then be moved to the dotted line position of Figure 4.

The bottom 12 is of a size usually approximating a conventional 8-inch in diameter pie pan and the top is of a size approximating a 9-inch in diameter pie pan. If it is desired to bake an 8-inch pie, the pie crust and filling to be baked into a pie is placed in the dish or depression formed by circular plate 18 and wall 19 and usually extends over the rim 20 and is fluted to provide a pleasing appearance. Any juices which sometimes bubble up during cooking particularly in the baking of fruit pies, may exude over the rim 20 and be caught in the annular depression 21.

However, when it is desired to provide a larger pie, the pan or utensil 10 may be inverted so that 11 becomes the bottom, the crust and filling then occupies the depression or dish circular plate 13, wall 14 and rim 15.

As many widely differing embodiments of this invention may be made without departing from the spirit and scope thereof, it is to be understood that the specific embodiments described are given by way of example only and the invention is limited only by the terms of the appended claims.

What I claim is:

1. A covered pie pan comprising a first dished member inverted with respect to a second dished member and forming a cover therefor, said first dished member including a planar bottom, a declined annular wall joined thereto, said declined wall being joined at its outward edge to an outwardly extending annular rim having a rolled peripheral edge, a second dished member having a dished diameter substantially smaller than the dished diameter of said first dished member, said second dished member comprising a planar bottom and an inclined wall joined thereto, said inclined wall being joined at its outward extension to a flat annular rim, said rim being joined at its outward edge to an annular depression, said annular depression terminating to an annular peripheral edge, said annular peripheral edge having two opposed handle means each including an extending handle portion and an inturned projection, said annular peripheral edge having means spaced between said handle means for biasing said first and second members to disengaged position, the rolled peripheral edge of said first member being adapted to seat on the annular edge of said second member and under said projections and in engagement with said biasing means for releasably securing said first and second members in juxtaposition.

2. A covered pie pan comprising a first dished member inverted with respect to a second dished member and forming a cover therefor, said first dished member including a planar bottom, a declined annular wall joined thereto, said declined wall being joined at its outward edge to an outwardly extending annular rim having a peripheral edge, a second dished member having a diameter substantially larger than the diameter of said first dished member, said second dished member comprising a planar bottom and an inclined wall joined thereto, said inclined wall being joined at its outward extension to a flat annular rim, said rim being joined at its outward edge to an annular depression, said annular depression terminating in an annular peripheral edge, said annular peripheral edge having two opposed handle means each including an extending handle portion and an inturned projection, the peripheral edge of said first member being adapted to seat on the annular edge of said second member and under said projections for releasably securing said first and second members in juxtaposition.

3. A covered pan comprising a first dished member inverted with respect to a second dished member and forming a cover therefor, said first dished member including a bottom, a wall joined thereto, said wall being joined at its outward edge to an outwardly extending rim having a peripheral edge, a second dished member having a dished diameter larger than the dished diameter of said first dished member, said second dished member comprising a bottom and a wall joined thereto, said wall being joined at its outward extension to a rim, said rim being joined at its outward extension to a depression, said depression terminating in a peripheral edge, said peripheral edge having a plurality of opposed handle means, each of said handle means comprising an extending handle portion and an inturned projection, the peripheral edge of said first member being adapted to seat on the peripheral edge of said second member and under said projections for releasably securing said first and second members in juxtaposition.

4. A subcombination comprising a dished member having a bottom and an inclined wall joined thereto, said inclined wall being joined at its outward extension to an annular rim, said rim being joined at its outward edge to an annular depression, said annular depression terminating to an annular peripheral edge, said annular peripheral edge having two opposed handle means each including an extending handle portion and an inturned projection, said annular peripheral edge having extending raised portions spaced between said handle means, said raised portions extending outwardly from the said annular peripheral edge in a direction opposite that of said annular depression.

References Cited in the file of this patent

UNITED STATES PATENTS

| | | |
|---|---|---|
| 1,028,726 | Holm | June 4, 1912 |
| 1,243,239 | Albrechtsen | Oct. 16, 1917 |
| 1,334,930 | Chadwick | Mar. 23, 1920 |
| 2,550,815 | Inwood | May 1, 1951 |
| 2,627,991 | Maersch | Feb. 10, 1953 |

FOREIGN PATENTS

| | | |
|---|---|---|
| 567,215 | Germany | Dec. 30, 1932 |